United States Patent [19]
Bielsten et al.

[11] 3,975,685
[45] Aug. 17, 1976

[54] MAGNETOELASTIC SHEAR FORCE MEASURING MEANS FOR MEASURING SHEAR STRESS IN TUBULAR AXLES

[75] Inventors: Nils-Ove Bielsten; Orvar Dahle; Ronald Grek; Lars-Erik Lindback; Sture Siby; Ake Widehn, all of Vasteras, Sweden

[73] Assignee: Allmanna Svenska Elektriska Aktiebolaget, Vasteras, Sweden

[22] Filed: Jan. 30, 1975

[21] Appl. No.: 545,626

[52] U.S. Cl. .......................... 324/34 ST; 73/88.5 R
[51] Int. Cl.² .......................................... G01R 33/12
[58] Field of Search ................. 324/34 ST, 34 MA; 73/88.5 R, DIG. 2, 136

[56] References Cited
UNITED STATES PATENTS 3,184,963  5/1965  Dahle .......................... 324/34 ST
3,465,581  9/1969  Hohenberg ..................... 73/136 A

FOREIGN PATENTS OR APPLICATIONS 257,112  11/1969  U.S.S.R. ........................ 324/34 ST

Primary Examiner—Robert J. Corcoran

[57] ABSTRACT

A magnetoelastic shear force measuring means for measuring shear stresses in tubular axles, preferably in aircraft landing gear axles, comprises two shear stress transducers. Each transducer has one iron core with winding to generate a magnetic field in the measuring object and a second iron core with winding to sense the field alterations generated in the measuring object by shear stresses. The two transducers are combined to form a measuring unit which is inserted in the tubular axle. The windings on the cores of the transducers are connected in such a way that the shear signals are added and signals from any torsion occurring are subtracted from each other.

5 Claims, 14 Drawing Figures

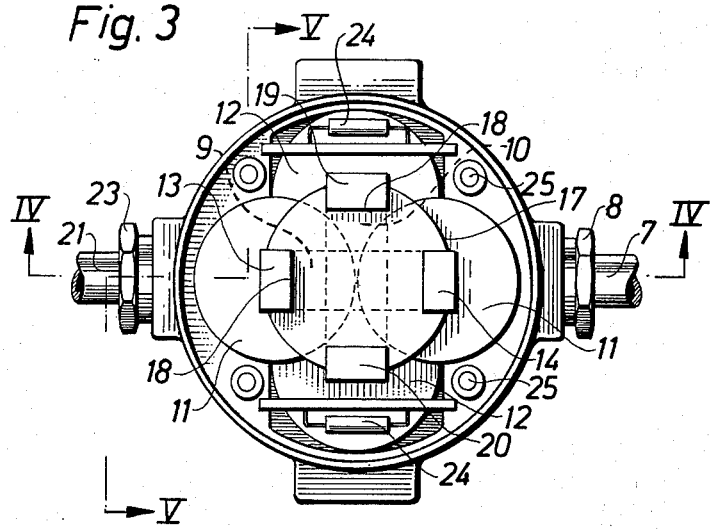
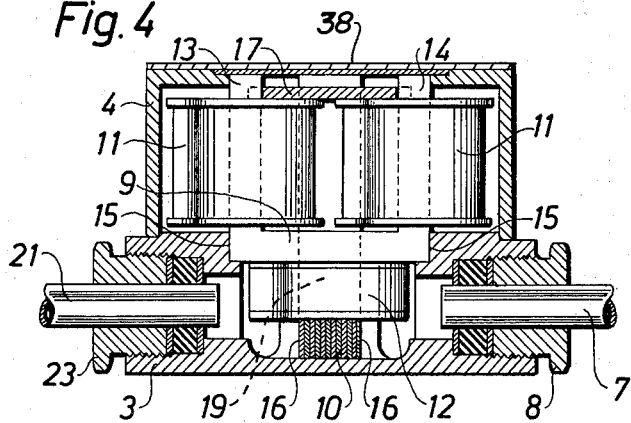
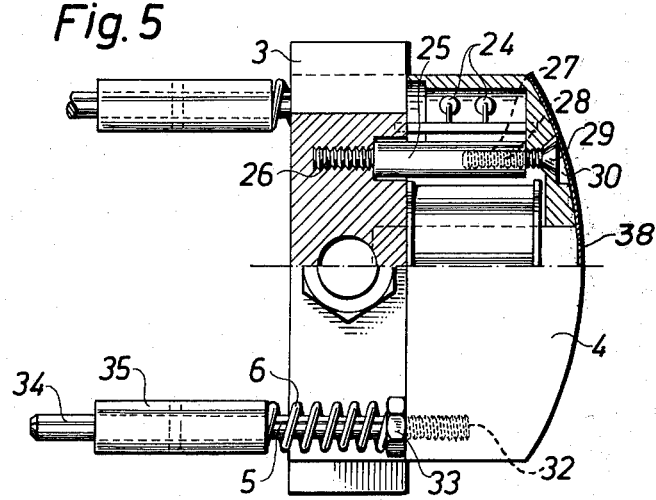

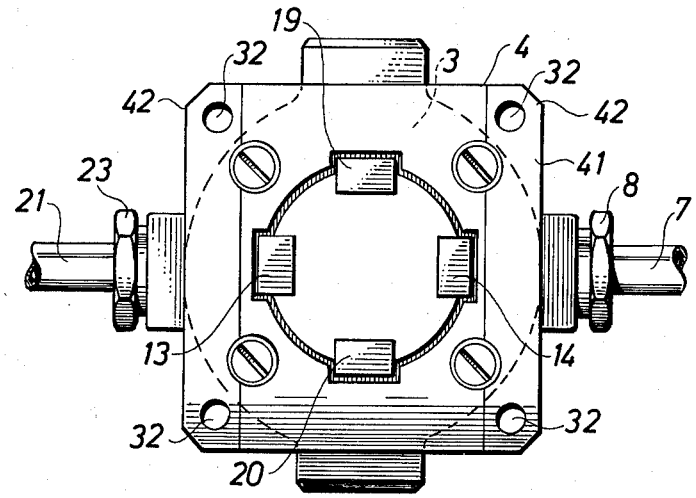
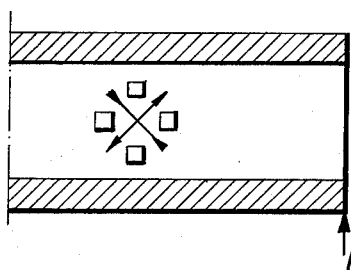 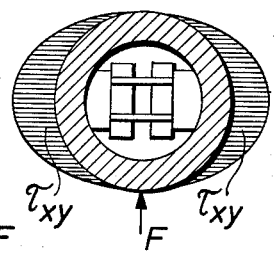 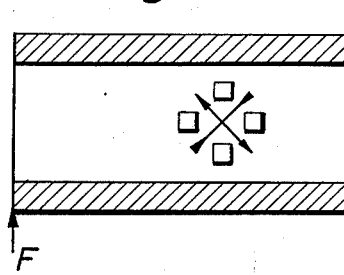
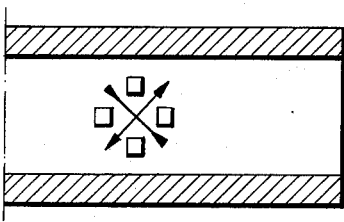 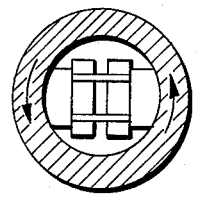 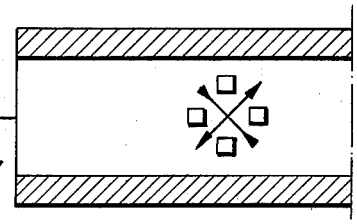

MAGNETOELASTIC SHEAR FORCE MEASURING MEANS FOR MEASURING SHEAR STRESS IN TUBULAR AXLES

BACKGROUND OF THE INVENTION

The measurement of shear stresses in hollow axles, particular in aircraft landing gear axles, is of extreme importance in the problem, vital to flying safety, of quickly and reliably determining the weight and center of gravity of an aircraft, which of course necessitates measurement of the vertical force in each of the landing gears. According to a known proposal this force is measured directly via the oil pressure in the hydraulic shock absorbers, but it has been impossible to achieve satisfactory accuracy with this method because of the unavoidable friction of the pistons.

Another method, which in principle is more accurate and which is widely used, makes use of strain-gauge transducers which measure the shear strain of a miniature axle clamped inside the hollow axles of the landing gear by means of expanding flanges which transfer deformations of the axle to the miniature axle. To achieve accurate measuring results, therefore, the miniature axle must be absolutely securely held inside the landing gear axle, and this seems to be difficult to achieve. In practice, therefore, it has proved difficult to maintain unaltered zero point after a landing, with the considerable stresses caused in the landing gear. Especially after a hard landing the zero point may alter by several per cent which is obviously most unsatisfactory.

SUMMARY OF THE INVENTION

The present invention relates to a magnetoelastic transducer means intended to be secured inside the axles of the landing gear in the same position as the transducers mentioned above. Since the magnetoelastic method measures the stresses directly in the measuring object, there is here no question of force transfer to the transducer. The requirements for securing the transducer are therefore less stringent in this case as it is only a question of fixing it in the correct position and there is no danger of an alteration in zero point caused by stresses during landing. The transducer means comprises two shear stress sensitive transducers, known per se, which are shown and described in U.S. Pat. No. 2,912,642, each having a first and a second substantially U-shaped, laminated iron core crossing each other at right angles and provided with windings, the first of said cores to be excited by alternating current to generate a magnetic field in a measuring object in front of the core poles. The second core with its winding is arranged to sense the field alterations caused in the measuring object by shear stresses. The two transducers are combined to form a measuring unit which is inserted in the tubular axle to a suitable measuring position. In this position each of the transducers is arranged so that one of the cores lies in an axial plane to the axle which is perpendicular to the transverse force exerted on the axle which causes the shear stresses. The two pole surfaces of each core are located at the same distance from the inner surface of the axle, and the windings on the transducer cores are connected in such a way that the shear signals are added and signals from any torsion occurring are subtracted from each other.

In order to achieve good stability both with respect to zero point and to sensitivity, each transducer must be constructed in such a manner that the two cores provided with windings under all circumstances maintain their perpendicular orientation with respect to each other with very high accuracy and that the distance between core poles and the surface of the axle is also kept constant.

In order to fulfil these requirements during the powerful acceleration and vibration occurring when landing and braking, the cores must first of all be secured very steadily in a housing for each transducer. The housings are further provided with suitable contact surfaces on the part facing the inner surface of the axle so that the poles are at a desired, fixed distance from the axle surface. Furthermore, the transducer housings must be guided with respect to each other by a slide arrangement so that corresponding cores in the two transducers will lie in the same plane. Pre-stressed pressure springs, suitably helical springs, are also arranged between the transducers to clamp the transducer means once it has been inserted in the measuring position in the axle by pressing the transducers against the inner surface of the axle with a force in the order of 100 kgf (1000 N) or more. A special tool is required for the insertion into the axle, which compresses the springs and determines the position of the transducer means both axially and angularly.

Since the transducers must function within an extremely wide temperature range the coefficients of expansion of the material in the housing components must be taken into account so that the temperature-dependence of the air gaps will be as small as possible. Since it is desirable from the weight point of view to use aluminium as far as possible, the great coefficient of expansion of this material may be compensated by the use of spacers having a lower coefficient of expansion than that of the cores, so that the size of the air gap will be affected as little as possible by temperature fluctuations.

Even when the above precautions are taken, both the zero point and the sensitivity are always affected to a certain extent by the temperature, because of unavoidable tolerances both during manufacture and with respect to properties of the material. The temperature dependence of the sensitivity can easily be compensated electrically for the complete transducer means. The temperature dependence of the zero point is not so simple to compensate. However, it is possible to reduce this dependence to a negligible value by measuring the individual temperature dependence of the transducers and using transducers having equivalent or substantially equivalent temperature dependence together in the transducer means.

When a magnetoelastic shear transducer of the type used in the transducer means is applied in front of a measuring object, the field picture is determined not only by the stress-dependent anisotropy of the permeability but also on eddy currents, especially at the area of intrusion into the measuring surface at the exicitation poles. As long as there is no contact with any other conducting material at the poles, these eddy currents will be distributed symmetrically and will not affect the balance. If, however, the transducer housing comes into contact with the measuring object close to an excited pole, there is a considerable risk that this contact will not be equally good across the whole of the surface in question. In this case asymmetrical eddy currents may easily occur which may cause extremely erratic alterations in the zero point. There are two ways of eliminating such eddy current disturbance. One is to completely insulate the contact surfaces of the transducer housings from the measuring object, in which case material having a low coefficient of expansion should be chosen. Possibly the contact surfaces may be plasma-sprayed with alumina or chromium carbide, which will also greatly increase the friction coefficient and therefore assist in keeping the transducer in position. The second possibility of eliminating eddy current disturbance comprises moving the contact surfaces of the transducer housings with the measuring object as far as possible away from the excitation pole surfaces, so that the disturbance becomes negligible.

When two transducers ae combined to form a transducer means for measuring inside a tubular axle with the transducers placed back to back, the space is normally extremely limited. If the transducers are constructed as shown and described in the above-mentioned U.S. Pat. No. 2,912,642, with two U-shaped cores crossing each other at a not inconsiderable distance, the space for the windings will be extremely limited, while at the same time the need of ampere turns is extremely great with such mechanically and magnetically hard measuring objects as aircraft landing gear axles, since too an excitation gives rise to hysteresis and creep. One method of increasing the winding space consists of constructing one of the cores, preferably the one in the sensing part of the transducer, with two straight sections joined by an annular part which surrounds the second core at sufficient distance to keep the magnetic stray coupling between the cores at a low level. This is of vital importance since the sensitivity of the zero point to unbalance in the air gaps is directly proportional to this magnetic stray coupling.

BRIEF DESCRIPTION OF THE DRAWINGS

In the accompanying drawings

FIG. 1 shows a cross section through a tubular shaft with a shear force measuring means according to the invention fitted in.

FIG. 3 is a top view of a transducer with the cover removed.

FIG. 4 is a cross section along the line IV—IV in FIG. 3.

FIG. 5 is a side view of the transducer, partly in section along the line V—V in FIG. 3.

FIG. 6 shows the transducer according to FIG. 3 with the cover in place.

FIGS. 9A–9C show the distribution of the shear stress and the directions of the principal stresses in the shaft when subjected to a transverse force F.

FIGS. 10A–10C show the directions of the principal stresses in the shaft when subjected to torque.

DESCRIPTION OF THE PREFERRED EMBODIMENT

Figure 1:
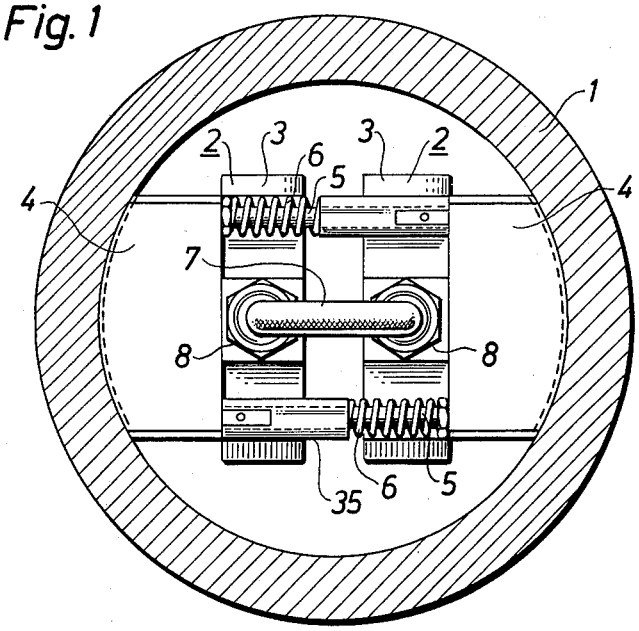

FIG. 1 shows a cross section through a hollow shaft 1 which in the present case is an axle of tempered steel for a wheel of a landing gear for large aircraft. Inside the hollow shaft is a magnetoelastic shear force measuring means to measure the shear stresses occurring in the shaft caused by the load of the aircraft on the wheel on the axle. The shear force measuring means is constructed of two shear stress sensing transducers 2 of the type known through U.S. Pat. No. 2,912,642. The transducers should be as alike as possible and comprise a housing 3 and a cover 4 secured to the housing, the side of the cover which faces away from the housing being adapted to fit the inner surface of the shaft 1.

The transducers are guided with respect to each other and kept pressed against the inner surface of the shaft with the help of a slide arrangement suitably comprising four guide pins 5 with helical springs 6. The pins with the springs are located outside the housings but extend into the covers and are supported by them so that the transducers are pressed away from each other towards the inner surface of the shaft. The two transducers are connected together electrically by means of a cable 7 inserted into the transducer housings by means of sealed couplings 8.

Figure 2:
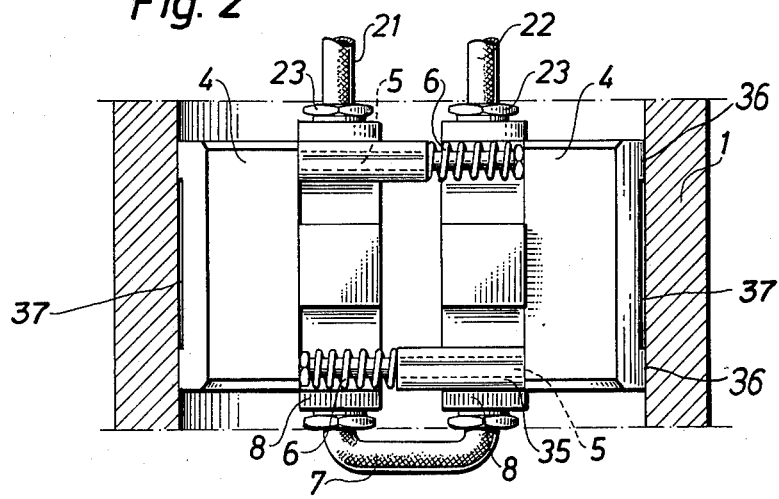
FIG. 2 is a view of the transducer according to FIG. 1, seen from above.

FIG. 3 shows a top view of a transducer with the cover removed. The transducer has two U-shaped iron cores 9 and 10 provided with windings 11 and 12. The two winding coils 11 forming the excitation winding of the transducer are arranged one on each leg of the U-shaped core 9 and are supplied from an AC source, not shown, as illustrated in FIGS. 3 and 5 of the U.S. patent mentioned above. This excitation circuit generates a non-homogenous magnetic flux in the measuring object which in this case is the tubular shaft 1, as can be seen in FIG. 2 of said patent. The excitation core 9 has two core legs 13 and 14 through which the flux is led to the measuring object.

The second iron core 10, together with the winding formed by the two coils 12, forms the sensing circuit of the transducer. The core 10 has two core legs 19 and 20. FIG. 4 shows that the two coils 12 are located below the excitation circuit and that the coils 11 take up a considerably greater volume than the coils 12. This is because in this case the measuring object consists of tempered steel and a considerable ampere turn rate is required to give sufficient flux in the measuring object. The sensing circuit is arranged perpendicular to the excitation circuit. It is extremely important both that the directioning of the two circuits is correct and also that the two circuits retain their positions with respect to each other even when subjected to external mechanical forces. For this reason the yoke of the cores is inserted in grooves in the housing 13. Thus the yoke of core 9 is inserted in groove 15 in the upper part of the housing and the yoke of core 10 is inserted in groove 16 in the lower part of the housing, as shown in FIG. 4. The free ends of the core legs are guided with respect to each other by means of a guide plate 17 of non-magnetic and high-resistive material in which recesses 18 are provided for the free ends of the core legs. This can be seen most clearly in FIG. 3. The transducer pair is connected electrically by cables 21, 22 secured to the transducer housing by conventional sealing screws 23. The transducer housing is also provided with components 24 to adjust the signal sensitivity of the transducer. The cover 4 is secured to the housing 3 by pins 25 screwed in the housing by their ends 26 as shown in FIG. 5. The other end of the pins is provided with a threaded aperture 27 into which a screw 28 is screwed. The head 29 of the screw is located in a recess 30 in the outer end piece 31 of the housing. Thus, by tightening the screw 28, the lid 4 is pressed against the housing 3 and clamped.

A spring slide arrangement is placed between the two transducers 2 to keep them pressed against the inside of the axle 1. This arrangement comprises four guide pins 5, one end of each pin, 32, being screwed into flange 41 of the cover 4. This flange is square and the four corners 42 therefore protrude outside the housing 3 which has a circular cross section. This is seen most clearly in FIG. 6. The pin 5 is locked to the cover 4 by a locking nut 33. The other end 34 of the pin runs freely in a corresponding aperture in the cover of the second transducer. Between the two covers the pin 5 is provided with a sleeve 35 and a spring 6. One end of the spring is in contact with the lid of the first transducer and the other end with the sleeve 35 so that the sleeve is pressed against the lid of the second transducer. This is also clear from FIGS. 1 and 2. The four guide pins are arranged so that two diametrically opposite pins are screwed into the housing of the first transducer whereas the other two are screwed into the housing of the second transducer. The two transducers will therefore be identical which is a great advantage from the manufacturing point of view.

Since the cover 4 of the transducer has a square cross section, the surface of the cover facing away from the transducer will be limited by two straight and two curved edges. This can be seen from FIGS. 2 and 4 and FIGS. 1 and 5. To obtain a more uniform and better defined air gap between the pole surfaces of the cores and the inner surface of the axle, the outer surface of the cover is ground so that the cover is in contact with the axle along two opposite edges of the cover. For technical reasons connected with the manufacture it is preferred to grind the cover so that abutment occurs along the two curved surfaces by means of two low flanges 36, as shown in FIG. 2.

Figure 7:
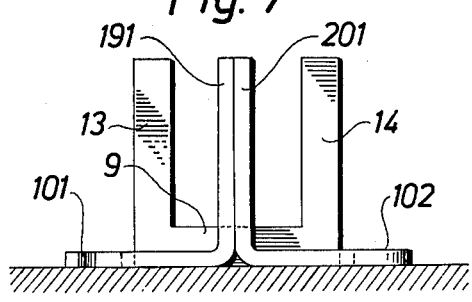
FIG. 7 shows a side view.
Figure 8:
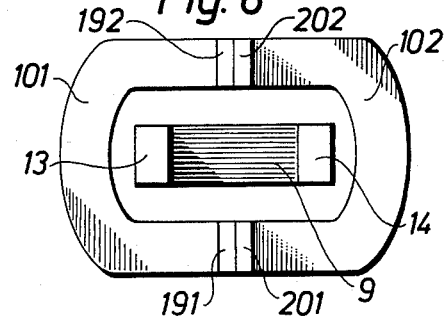
FIG. 8 a top view of a core construction giving the transducer low height.

Since the windings 12 in the sensing circuit are located below the windings 11 in the excitation circuit, the transducer will be relatively tall. It may therefore be preferable in the case of small shaft diameters to place all the windings in the same plane. FIGS. 7 and 8 show how the iron cores in the two circuits may be shaped for this purpose. One core, 9, with core legs 13 and 14, is still U-shaped, but the other core is made of two similar parts each comprising a U-shaped yoke section 101, 102, and two upwardly bent leg sections 191, 192 and 201, 202, respectively.

The space 37 between the two flanges 36, the outer surface of the cover 4 and the inner surface of the axle 1 serves to insulate the cover and the axle with respect to each other. Thereby the influence of asymmetrical eddy currents in the area of flux intrusion into the measuring surface will be avoided.

Another method of eliminating the influence of asymmetrical eddy currents in the measuring surface is to provide the area of the transducer which is in contact with the measuring object with an insulating layer 38 of, for example, plasma-sprayed alumina or chromium carbide as is shown in FIGS. 4 and 5.

As the shear force measuring means consists of two exactly similar transducers arranged inside the axle to measure the shear stresses occurring in the axle when the wheel arranged on the axle is subjected to load, the measuring means will be insensitive to torsional stress which occurs in the axle during braking if, for example, the aircraft is on a surface which inclines either backwards or forwards and the brakes are engaged. FIG. 9A shows a cross section through the axle with shear force measuring means in place and illustrating the shear stress distribution ($\tau \times y$) caused by the wheel load. FIGS. 9B and 9C show the directions of the principal stresses in the axle in the measuring zones of the transducers. The transducers are connected in such a way that their measuring signals are added. FIG. 10A shows a torsional moment exerted on the axle. FIGS. 10B and 10C show the directions of the principal stresses thus caused in the axle at the measuring zones of the transducers. A comparison with FIGS. 9B and 9C shows that in the case of the torsional moment the signals produced in the transducers will be subtracted from each other and, since the two transducers are presumed to be similar, the output signal from the shear force measuring means caused by torsional moment will be zero.

We claim:

1. Magnetoelastic shear stress measuring means for measuring shear stress in tubular axles, comprising first and second shear stress transducers, each transducer having two basically U-shaped iron cores provided with windings, said cores being oriented perpendicular to each other, the first of said cores to be excited by alternating current to generate a magnetic field in a measuring object located in front of the core poles, whereas the second of said cores with its winding is arranged to sense the field alterations caused in the measuring object by shear stresses, the two transducers (2) being combined to form a measuring unit, said measuring unit including means engageable with the inside of the axle when the unit is inserted in the axle (1) to a suitable measuring position, the two transducers having a common axis of symmetry and a slide arrangement holding the transducers together for permitting alteration of the distance between the two transducers along said axis of symmetry, said slide arrangement comprising a spring device which presses the transducers away from each other towards the inner surface of the axle, thus retaining the shear force measuring means in the desired position in the tubular axle, each transducer comprising a housing (3) having a lid (4), both the housing and the lid being of non-magnetic material, the part of the housing facing the inner surface of the axle and the surface of the axle being arranged in insulated relation to each other, at least in the vicinity of the pole surfaces in order to eliminate unstable eddy currents, which would otherwise randomly disturb the balance of the transducer.

2. Shear stress measuring means according to claim 1, in which the surfaces of the transducers facing the inner surface of the axle are coated with an electricaly insulating layer of plasma-sprayed material to eliminate unstable eddy currents which otherwise disturb the balance of the transducers.

3. Shear stress measuring means according to claim 1, in which the transducer covers (4) are provided with raised contact surfaces on the side facing the inner surface of the axle, said contact surfaces lying at such a distance from the poles of the iron cores that varying metallic contact between covers and axle does not give rise to noticeable eddy current disturbance.

4. Shear stress measuring means according to claim 1, in which the sum of the products of length and the coefficient of expansion is substantially the same for the cores and for the elements controlling the distance between the base of the core and the inner surface of the axle, whereby the air gaps become substatially independent of the temperature.

5. Shear stress measuring means according to claim 1, in which the two transducers (2) are matched with respect to the temperature dependence of the no-load signal both as to size and sign, so that the temperature dependence of the no-load signal of the measuring means is substantially compensated.

* * * * *